United States Patent [19]

Foris et al.

[11] 4,100,103

[45] Jul. 11, 1978

[54] CAPSULE MANUFACTURE

[75] Inventors: Peter L. Foris; Robert W. Brown; Paul S. Phillips, Jr., all of Appleton, Wis.

[73] Assignee: NCR Corporation, Dayton, Ohio

[21] Appl. No.: 755,830

[22] Filed: Dec. 30, 1976

[51] Int. Cl.$^2$ .............................................. B01J 13/02
[52] U.S. Cl. .................................. 252/316; 71/64 F; 106/308 M; 252/182; 252/522; 424/32; 426/650; 427/151; 427/152; 428/307; 428/914
[58] Field of Search ................. 252/316; 427/151, 152

[56] References Cited

U.S. PATENT DOCUMENTS

| 3,074,845 | 1/1963 | Geary ..................................... 424/23 |
| 3,607,775 | 9/1971 | Yoshida et al. .................... 424/33 X |
| 3,726,803 | 4/1973 | Bayless et al. ..................... 424/32 X |

Primary Examiner—Richard D. Lovering
Attorney, Agent, or Firm—Birch, Stewart, Kolasch and Birch

[57] ABSTRACT

A process is disclosed for performing encapsulation, en masse, by an in situ polymerization reaction to yield capsule wall material. The polymerization comprises a reaction between melamine and formaldehyde and/or polycondensation of monomeric methylol melamine or etherified methylol melamine, or a low molecular weight polymer thereof, in an aqueous vehicle and the reaction is conducted in the presence of negatively-charged, carboxyl-substituted, linear aliphatic hydrocarbon polyelectrolyte material dissolved in the vehicle. Liquid-liquid phase separation is accomplished and maintained by increase in the molecular weight of the resulting condensation polymer without further dilution of the manufacturing vehicle. The negatively-charged polyelectrolyte material is required and has an apparent effect of controlling or modifying the polymerization reaction. The disclosed encapsulation process permits manufacture of micro-capsules in concentrations of capsule to capsule manufacturing vehicle higher than previously possible.

17 Claims, No Drawings

4,100,103

CAPSULE MANUFACTURE

BACKGROUND OF THE INVENTION

1. Field of the Invention

The present invention relates to a process for manufacturing minute capsules, en masse, in a liquid manufacturing vehicle. More particularly, the process of the invention involves liquid-liquid phase separation of a relatively concentrated solution of polymeric material to be used in the formation of walls for the minute capsules.

En masse processes for the manufacture of microcapsules have generally required large amounts of liquid manufacturing vehicle and have generally resulted in low yields of capsules. An encapsulating system and process which utilizes relatively small amounts of manufacturing vehicle to generate relatively large amounts of microcapsules would be valuable from several viewpoints. For example, the costs of transporting the capsule product, as manufactured, would be reduced because the product contains less vehicle. As another example, in the case where the capsule product is to be coated to a dried film on a sheet substrate, coating costs are reduced because there is less liquid vehicle to be removed from the substrate.

Many combinations of materials have been used in the past in search of compositions which yield certain physical characteristics in capsule walls or which permit performing the encapsulating process under certain desired or required conditions. As examples of desirable capsule characteristics, small size, impermeability of capsule walls to diffusion and the strength of capsule walls to withstand normal handling forces can be mentioned. As examples of desirable process conditions, relatively high pH, relatively short times, and relatively high yields and concentration are important.

It is, therefore, an object of the present invention to provide a capsule manufacturing process wherein capsules are produced in high yield, in high concentration and over a wide range of operable reaction temperatures.

Another object of the invention is to provide a process which requires a relatively shorter time for completion and which utilizes process conditions of increased convenience.

A further object of the present invention is to provide a process for manufacturing microcapsules, which microcapsules have walls of increased resistance to accidental rupture.

It is yet another object of this invention to provide a process for producing microcapsules which have little color when containing basic chromogenic materials.

It is a specific object of this invention to provide an encapsulating process wherein the capsule wall material comprises a melamine-formaldehyde polymeric material wherein the melamine-formaldehyde wall material is generated by an in situ condensation reaction in the presence of a negatively-charged, carboxyl-substituted, linear aliphatic hydrocarbon polyelectrolyte material dissolved in the capsule manufacturing vehicle.

These and other objects and advantages of the present inventio will become more apparent to those skilled in the art from a consideration of the following specification and claims.

DESCRIPTION OF THE PRIOR ART

South African Pat. No. 62/939, issued on Mar. 6, 1972, and corresponding in most respects to U.S. Pat. No. 3,516,941, discloses a preparation of microcapsules by the in situ polymerization of amides or amines and aldehydes. There is no disclosure therein concerning the use of a negatively-charged polyelectrolyte material to modify or otherwise affect the polymerization reaction or product. In fact, this patent specifically teaches conducting the process in the absence of wetting agents.

U.S. Pat. No. 3,755,190, issued Aug. 28, 1973, discloses a microencapsulating process wherein the capsule wall material is a polyhydroxy phenolic/aldehyde polymeric material generated in the presence of poly(vinyl alcohol).

U.S. Pat. No. 3,726,803, issued on Apr. 10, 1973, discloses microcapsules having a composite capsule wall structure of hydrophilic polymeric material interspersed by a hydrophobic polymeric material. The hydrophobic polymeric material is disclosed to be an in situ-generated condensate of a polyhydroxy phenolic material and an aldehyde.

U.S. Pat. No. 3,016,308, issued on Jan. 9, 1962, discloses encapsulation by continued polymerization of a urea/formaldehyde resin dissolved in an aqueous manufacturing vehicle with a polymeric wetting agent. The process taught therein utilizes urea/formaldehyde resin as a starting material and a slight amount of wetting agent to maintain an emulsion during the continued polymerization.

British Pat. No. 1,156,725, published on July 2, 1969, and corresponding to U.S. Pat. No. 3,594,328, teaches an encapsulation process utilizing surface-active, cross-linkable etherified methylol melamines wherein the methylol melamine is partially etherified with hydroxy compounds of the formula $HO-(CH_2-CH_2-O)_nH$ and with monoalcohols containing 4 to 7 carbon atoms.

U.S. Pat. No. 3,418,656, issued on Dec. 24, 1968, teaches a method of encapsulation wherein a partially-condensed melamine-formaldehyde resin is phased out of solution by dilution with water in the presence of an amphiphilic emulsifying agent to produce capsule walls. The amphiphilic emulsifying agents can be copolymers of methyl vinyl ether and maleic anhydride.

Other prior art patents include U.S. Pat. No. 3,074,845, U.S. Pat. No. 3,449,228 and U.S. Pat. No. 3,607,775, however, none of these patents is considered to be pertinent to the presently claimed invention.

Copending application Ser. No. 487,322, now U.S. Pat. No. 4,001,140, of the present inventors describes a process wherein a negatively-charged polymeric, polyelectrolyte system modifier is used with a urea-formaldehyde polymerization to yield capsule wall material. Another copending application by the same inventors, filed on even date herewith, teaches a similar process wherein dimethylol urea or methylated dimethylol urea is employed as a starting material for the formation of the condensation polymer.

However, none of this prior art teaches the production of microcapsules from the in situ polymerization of the melamine starting materials in the presence of anhydride copolymers as described in the present application.

SUMMARY OF THE INVENTION

The present invention provides several advantages over the prior procedures, including the substantially complete utilization of the starting materials to form the condensation polymer which makes up the wall material and a decidedly smaller coloration in the resulting capsule batches when containing a basic chromogenic material. Moreover, the present process can be performed at substantially lower viscosities than possible with other encapsulation processes, i.e., as in copending application Ser. No. 487,322, now U.S. Pat. No. 4,001,140, which employ high concentrations of core materials and capsule wall forming materials.

One of the aspects of the present invention involves the starting materials used to form the condensation polymer which makes up the resulting capsule walls. Thus, the resulting condensation polymer, in one embodiment of the invention, is formed by the polycondensation of melamine with formaldehyde. In other embodiments of the invention, methylol melamines, such as trimethylol melamine, or methylated methylol melamines may be employed in an in situ polymerization reaction to yield the desired condensation polymer.

It is of significance to note that the reaction of melamine with formaldehyde to form capsule walls in the present invention is conducted in the absence of urea. This polymerization between melamine and formaldehyde, conducted in the presence of said anhydride copolymers, permits encapsulation over wider ranges of reactant molar ratios and at pH ranges unattainable by the methods taught in said copending applications.

The methylol melamines employed in the present invention are known per se in the prior art and are available commercially, for example, the "Resimene" series of melamine resins marketed by Monsanto. The chemical structure of, for instance, trimethylol melamine is as follows:

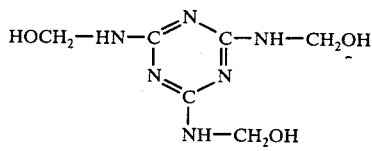

The methylated methylol melamines are likewise known in the prior art and are sold commercially under various designations. Methylated methylol melamines which may be employed in the present invention include those marketed as follows:

Valmel 40 (United Merchants) (methylated trimethylol melamine resin)
Parez 613 and 707 (American Cyanamid)
Cymel 300-301 (American Cyanamid) (hexamethoxymethylmelamine having the formula:

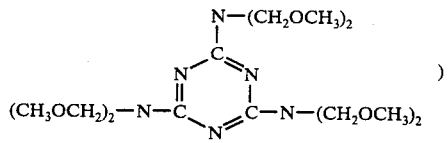

)

Cymel 385 (American Cyanamid) (methylated methylol melamine containing 13% methylol content)
Resloom M-75 or RM-441 (Monsanto) (M-75 is a monomeric form of methylated methylol melamine. RM-441 is a syrup of methylated methylol melamine resin)
Resloom RT-183 or RT-202 (Monsanto) (alkylated melamine-formaldehyde resins)
Resloom RM-442 (Monsanto) (liquid melamine-formaldehyde resin)
Resimene (Monsanto) (series of methylated methylol melamines)
Cascomel PR-601 or PR-609 (Borden Chemical) (liquid melamine-formaldehyde resin)

Generically, the chemical structure of said etherified (methylated) methylol melamines is as follows:

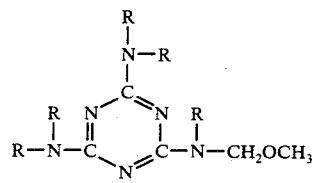

wherein R is H, $CH_2OH$ or $CH_2OCH_3$.

Thus, in addition to the use of melamine with formaldehyde in accordance with this invention, capsule walls can be produced utilizing melamines which are methylolated with from one to six methylol groups and, moreover, of these methylol groups, from one up to all of them can be etherified. In addition, the present invention can be practiced successfully with any of the compounds or mixtures of compounds within the defined range or with oligomers or mixtures of oligomers of these melamine compounds, for example, containing five or six monomeric units thereof. In general, the compounds in the lower range of methylolation and etherification are preferred because of their greater water solubility and because of their faster reactivity.

The anhydride copolymer modifies the polymerization of the starting materials used in the present invention. The additive component material believed to be required for realizing the benefits described herein is a negatively-charged polymeric polyelectrolyte material having a linear aliphatic hydrocarbon backbone with an average of about two carboxyl (or anhydride) groups for every four to six backbone carbon atoms. Use of the proper kind and amount of this system modifier is necessary to permit the manufacture of microcapsules having a melamine-formaldehyde polymeric wall material in a high capsule concentration, a low vehicle viscosity, and at a beneficially high pH condition.

The role of the system modifier is not well understood and is especially difficult to understand because the modifier is not included in the finished capsule walls in appreciable amounts. The system modifier appears to take some active part in the resulting polymerization reaction but, nevertheless, the finished capsule walls retain only a minor residual amount of the system modifier. To be effective, the system modifier must be included in the encapsulating system before the commencement of the polycondensation reaction. As a result, the encapsulation process of the present invention to form melamine-formaldehyde polymeric capsular walls has advantages over the known encapsulation processes with respect to a more efficient utilization of polymeric wall material, a greater rate of capsule formation, reduced capsule color, and processing at lower viscosities. Moreover, all of these advantages are attained with the simpler procedure of the invention as compared to the prior art encapsulating processes.

Examples of eligible carboxyl group system modifiers to be employed as additives in the present invention include hydrolyzed maleic anhydride copolymers, which are preferred, such as poly(ethylene-co-maleic anhydride) (EMA), poly(methyl vinyl ether-co-maleic anhydride) (PVMMA), poly(propylene-co-maleic anhydride) (PMA), poly(butadiene-co-maleic anhydride) (BMA), poly(vinyl acetate-co-maleic anhydride) (PVAMA), and the like; and polyacrylates, such as poly(acrylic acid), and the like.

Because of more favorable results with regard to processing conditions, preferred poly(ethylene-co-maleic anhydride) should have a molecular weight above about 1000; poly(methyl vinyl ether-co-maleic anhydride) above about 250,000; and poly(acrylic acid) above about 5,000.

The material contained within the capsule walls formed in accordance with this invention, i.e., the capsular internal phase or capsule core material, is relatively unimportant to the practice of the invention and can be any material which is substantially water-insoluble and which does not interact with the intended capsule wall material, or with other encapsulating-system components, to the detriment of the process. A few of the materials which can be utilized as capsule internal phases include, among a multitude of others: water-insoluble or substantially water-insoluble liquids, such as olive oil, fish oils, vegetable oils, sperm oil, mineral oil, xylene, toluene, kerosene, chlorinated biphenyl and methyl salicylate; similar substantially water-insoluble materials of a solid but meltable nature such as naphthalene and cocoa butter; water-insoluble metallic oxides and salts; fibrous materials, such as cellulose or asbestos; water-insoluble synthetic polymeric materials; minerals, pigments; glasses; elemental materials including solids, liquids and gases; flavors, fragrances; reactants; biocidal compositions; physiological compositions; fertilizer compositions; and the like.

The process of this invention specifically and preferably includes as one embodiment the steps of establishing an aqueous, single-phase solution of the system modifier into which is dispersed the intended capsule core material (substantially insoluble in the solution and substantially chemically unreactive with any of the solutes) and the starting polycondensation materials, i.e., the melamine and formaldehyde or the methylol melamine or methylated methylol melamine. The polycondensation reaction proceeds, preferably but not necessarily with heating and/or agitation such as stirring, to provide a melamine-formaldehyde polymer which separates from the solution as a liquid solution phase. The separated liquid phase containing said condensation polymer wets and enwraps particles of the dispersed capsule core material to yield liquid-walled embryonic capsules. Continuation of the polycondensation reaction yields solid and substantially water-insoluble capsule walls. It is important to note that: (a) after makeup of the system and commencement of the capsule wall-forming condensation reaction, there is no dilution step in the process; (b) the presence of the system modifier permits generation of a high concentration of condensation polymer at a relatively low viscosity; and (c) the resulting high concentration-low viscosity system permits liquid phase separation and subsequent polymerization to a solid to produce capsules, en masse, in a concentration (by volume) in the manufacturing vehicle which has not been possible in the prior art procedures.

Alternatively, the procedure can be modified and the various system components can be combined in any desired order with the limitation that the system modifier must be present in the system at the time that the polymerization reaction begins and prior to dispersion of the capsule core material. Thus, the capsule core material can be dispersed in the system at any time before the separated liquid phase of polymeric material becomes solid or is so polymerized that dispersed capsule core particles are not enwrapped by the resulting polymer.

The polymerization reaction, even as altered by the system modifier, is a polycondensation conducted in an acid medium. The condensation can be accomplished in an aqueous system having a pH of about 4.3 to 6, the time and temperature requirements being variable to optimize the reaction. As an effect of the system modifier and its relation to the polycondensation reaction, the preferred pH for operation of this invention is from 4.5 to 6.0, the preferred pH being about 5.3, for the melamine-formaldehyde and methylol melamine systems. When methylated methylol melamine is used, a pH range of from 4.3 to 5.6 is suitably employed, the preferred pH being about 4.8.

In the embodiment of the invention where melamine and formaldehyde are used as the starting reactant materials, it has been found that a wide range of molar ratio of formaldehyde to melamine can be utilized. However, a molar ratio of about 2-3 : 1 is advantageously employed.

After the reaction has progressed to the point where the capsule walls have been solidified and, in that respect, the capsule manufacture is completed, the capsules can be separated from the manufacturing vehicle by filtering and then washed with water. The capsule walls are dried by placing the capsules in a forced air dryer. It should be understood, however, that the capsules need not have dried walls or even be separated from the liquid vehicle prior to their use. If it is desired or required for some intended purpose, the capsule product of this invention can be supplied as a slurry of capsules in a liquid carrier, either the manufacturing vehicle or not, such as for use in a paper coating composition, a paint, an insecticide composition, or the like, such uses being previously taught in the prior art.

Individual capsules prepared by the present invention are substantially spherical and can be manufactured having diameters of less than 1 micron to about 100 microns, the preferred size range being from about 1 to about 50 microns, in diameter.

DESCRIPTION OF THE PREFERRED EMBODIMENTS

Unless otherwise specified, all percentage and part designations indicate percent and parts by weight. All solutions, unless otherwise designated, are aqueous solutions.

EXAMPLE 1

In this example, poly(ethylene-co-maleic anhydride) is used to modify a melamine-formaldehyde encapsulating system. A suitable poly(ethylene-co-maleic anhydride) includes approximately equimolar amounts of ethylene and maleic anhydride and has a molecular weight of about 75,000 to 90,000 such as, for example, the product sold by Monsanto Company, St. Louis, Missouri, under the trademark "EMA-31".

The capsule contents, termed the "internal phase" (IP) in this application, comprises an oily solution of a colorless chromogenic dye precursor material, such as described in U.S. Pat. No. 3,681,390 issued on Aug. 1, 1972. The capsules of oily dye solution are generally in a uniform size range of about 1 to 15 microns. The standard IP used in the examples described herein comprises 1.7% of 3,3-bis(4-dimethylaminophenyl)-6-dimethylaminophthalide (commonly known as Crystal Violet Lactone), 0.55% of (2'-anilino-3'-methyl-6'-diethylamino fluoran) and 0.55% of 3,3-bis(1-ethyl-2-methylindol-3-yl)phthalide (sometimes known as Indolyl Red) in a mixture of solvents including a benzylated ethyl benzene and a relatively high-boiling hydrocarbon oil, such as one having a distillation range of 400°–500° F.

A solution is made of a mixture of 100 grams of a 10% solution of said EMA-31 and 200 grams of water. The pH of this solution is raised to 4.5 with 20% sodium hydroxide. Then into this solution is emulsified 200 ml. of said IP. The emulsion is placed, with stirring, into a water bath at 55° C. A solution prepared by heating a mixture of 26.5 grams of 37% formaldehyde and 20 grams of melamine is added thereto. After 2 hours, the heating control is turned off and the capsule batch continues to stir in the cooling water bath overnight.

Because the size of the resulting capsules is so small and because the intended capsule use is in carbonless copying papers, the capsules are tested by methods which relate to effectiveness in a copying paper use. As a general description, the capsules are coated onto a sheet termed a "CB Sheet" (sheet with Coated Back) and are tested in conjunction with a standardized sheet termed a "CF Sheet" (sheet with Coated Front). The coating of the CB Sheet includes about 75 percent capsules, 18 percent wheat starch and 7 percent of gum binder such as, for example, the hydroxyethylether of corn starch or other water-soluble starch derivatives; and is made up by combining 100 parts of aqueous capsule slurry having 40 percent capsules, 125 parts of water, 10 parts of wheat starch and 40 parts of a 10 percent aqueous solution of the gum binder—all adjusted to about pH 9. The coating is cast using a wire-wound rod designed to lay a 20 pounds per ream (3300 square feet) wet film coating.

The coating of an exemplary CF Sheet includes a metal-modified phenolic resin reactive with the dyes, kaolin clay and other additives and a binder material. A CF Sheet is described in U.S. Pat. No. 3,732,120.

When a CB Sheet and a CF Sheet are placed in coated face-to-coated face relation and pressure is applied, capsules of the CB Sheet rupture and capsule-contained material is transferred to and reacted with the acid component of the CF Sheet to yield a color. A test associated with such capsule rupture and color formation is Typewriter Intensity (TI) and TI values indicate ratios of reflectances—the reflectances of marks produced on the CF Sheet by a typewriter striking two sheets together versus the paper's background reflectance. A high value indicates little color development and a low value indicates good color development.

$$TI = \frac{\text{Printed Character Reflectance}}{\text{Background Reflectance}} \times 100$$

A related test concerning capsule quality is the degree of loss of ability of capsule-coated paper to produce transfer prints in a typewriter test after storage of the coated paper in an oven at a specified temperature for a specified time. It is useful to perform a routine typewriter imaging transfer test with a CB/CF couplet, placing the CB in a 95° C. oven for 18 hours and then reimaging the couplet after storage. This test has consistently shown that poor capsules will lose most or all of their ability to make a transfer print during such oven storage and that good capsules will withstand this storage with little or no loss in ability to give a print. One of the significant advantages of the present invention is that good capsule quality is consistently obtained over a wide range of formaldehyde to melamine ratio. These satisfactory results are reflected in the table below where the F:M (formaldehyde to melamine) ratio, intial typewriter intensity, ITI (before oven storage) and typewriter intensity (TI) after oven storage are given for capsules made in accordance with the procedure described in this example:

| F:M Ratio | ITI | TI after overnight storage at 95° C. |
| --- | --- | --- |
| 2.06 | 63 | 66 |
| 4.14 | 54 | 59 |

In contrast thereto, the quality of capsules made from urea-formaldehyde polymeric material in the presence of an anhydride copolymer is quite sensitive to the formaldehyde to urea molar ratio.

Thus, the present invention provides capsules having good shelf life, stability and storage properties.

EXAMPLE 2

Capsules are made in the same manner as described in Example 1. A solution is made of a mixture of 100 grams of a 10% solution of poly(ethylene-co-maleic anhydride) and 200 grams of water. The pH of this solution is adjusted to 4.5 with 20% NaOH. Into this solution is emulsified 180 grams of the IP described in Example 1. The emulsion is placed, with agitation, into a water bath at 55° C. Added thereto are 27 grams of 37% formaldehyde solution and 12.6 grams of dry melamine. Stirring is continued for several hours at 55° C. to give capsules of good quality.

EXAMPLE 3

A solution of 100 grams of water and 50 grams of a 10% solution of poly(methyl vinyl ether-co-maleic anhydride) ("Gantrez 119") is adjusted to a pH of 4.73 with 20% NaOH. One hundred ml. of IP is emulsified into the solution, and the resulting emulsion is placed in a 55° C. water bath. A 23.3 gram portion of a solution of 80 grams of melamine in 106 grams of a 37% aqueous solution of formaldehyde is added to the emulsion with stirring. The stirring is discontinued, and the heat to the water bath is turned off after one hour and 40 minutes.

The reflectance reading of a draw-down on a CF Sheet after 22 hours was 65%.

The CF draw-down test is a method of determining capsule wall formation. The encapsulation emulsion containing all of the capsule-forming ingredients is coated onto a reactive CF Paper. A color is formed by the reaction of the dye with the CF coating. Wall formation is demonstrated by the mitigation of the color when the emulsion is coated at a later time and is measured by an opacimeter to give the reflectance of the coated area.

EXAMPLE 4

A solution of 280 grams of water and 20 grams of a 50% solution of poly(acrylic acid) ("Good-rite K-732", B. F. Goodrich Chemical Co., Cleveland, Ohio) is adjusted to a pH of 5.12 with 20% NaOH. Into the solution is emulsified 200 ml. of IP. The emulsion is placed in a 55° C. water bath, and a 46.6 gram portion of a solution of 80 grams of melamine in 106 grams of 37% formaldehyde is added thereto with stirring. The heating and stirring are continued for 19 hours.

At the end of 19 hours, the reflectance reading of a draw-down on a CF sheet was 70%.

EXAMPLE 5

A solution of 111.5 grams of water and 38.5 grams of a 13% solution of poly(butadiene-co-maleic anhydride) ("Maldene 285", Borg-Warner Corp.) is adjusted to a pH of 5.12 with 20% NaOH. Into the solution is emulsified 100 ml. of IP. The resultant emulsion is placed in a 55° C. water bath, and a 23.3 gram portion of a solution of 100 grams of melamine in 132.5 grams of 37% formaldehyde is added thereto with stirring. The stirring is discontinued after 4 hours, but the heating is continued for a total of 21 hours.

At the end of the time, the reflectance of a draw-down on a CF sheet was 60%.

EXAMPLE 6

A solution of 154.5 grams of a 10% solution of poly(ethylene-co-maleic anhydride) ("EMA-31") and 309 grams of water is adjusted to a pH of 4.5 with 20% NaOH. Into this solution is emulsified 520.7 grams of standard IP as described in Example 1.

Sample A

A 318.5 gram portion of the above emulsion is placed in a 55° C. water bath with stirring, and 32.4 grams of a 60% aqueous solution of a methylol melamine resin ("Resimene 814", Monsanto) is added thereto.

Sample B

The same procedure as described for Sample A is followed, except that the methylol melamine resin "Resimene 817" (Monsanto) is used.

Sample C

The same procedure as described for Sample A is followed, except that the methylol melamine resin "Resimene 836" (Monsanto) is used.

All three batches are stirred in the water bath overnight. The heat to the bath is turned off after two hours.

Capsules of good quality are obtained from all three batches as evidenced by the color obtained on a CF sheet after three hours:

| Opacimeter Reading of Draw-Downs on CF Sheets | | |
|---|---|---|
| Sample A | Sample B | Sample C |
| 78 | 69 | 68 |

All three of these sample batches were formulated and coated in a conventional manner to produce satisfactory CB sheets.

EXAMPLE 7

A solution of 50 grams of a 10% solution of poly(methyl vinyl ether-co-maleic anhydride) ("Gantrez AN-119", GAF, molecular weight approximately 250,000) and 100 grams of water is adjusted to a pH of 4.5 with 20% NaOH. A 60% solution of methylol melamine in the amount of 35 grams ("Resimene 814", Monsanto) is added to the solution, and 150 cc. of IP is emulsified therein. The emulsion is placed in a 55° C. water bath with agitation.

Successful capsules are obtained after 90 minutes as evidenced by an opacimeter reading of 71 obtained on a draw-down on a CF sheet.

EXAMPLE 8

The pH of a mixture of 100 grams of a 10% solution of poly(ethylene-co-maleic anhydride) ("EMA-31") and 200 grams of water is adjusted to 4.0 with sodium hydroxide. Into this solution is emulsified 200 ml. of standard IP as described in Example 1. This emulsion is placed in a water bath at 55° C. and, with stirring, 64.6 grams of methylated methylol melamine resin ("Resloom M-75", Monsanto, 60% solids) is added thereto. After 2 hours, the heating of the water bath is discontinued and the batch is allowed to stir overnight in the cooling water bath. During the encapsulation process the pH rises to approximately 4.8. The course of the encapsulation reaction is followed by drawing down samples of the batch, at various time intervals after addition of the etherified methylol melamine, on an acid CF coating and measuring the intensity of the color formed by means of an opacimeter. The following is a typical measurement of such drawdown intensities with a capsule batch made from Resloom M-75 at 55° C. Presented for comparison is a urea-formaldehyde capsule batch made at pH 3.5 as in Ser. No. 487,322, now U.S. Patent No. 4,001,140:

| | Opacimeter Reading of Draw-Down on CF | | | | |
|---|---|---|---|---|---|
| Time after mixing | 5 min. | 15 min. | 30 min. | 1 hr. | 1½hr. |
| Present Invention | 44 | 29 | 84 | — | — |
| Urea-Formaldehyde capsule system | 36 | 32 | 23 | 27 | 70 |

For this test when the opacimeter reading is approximately 60 or greater, the oil drop is assumed to be protected and the encapsulation is a success. It can be seen from the above data that the present invention at 55° C. provides protection to the Internal Phase (IP) much faster than does the urea-formaldehyde system. This phenomenon can be modified such that protection can be obtained at a lower temperature in equal time:

| Opacimeter Readng of CF Draw-Down | | |
|---|---|---|
| Time after adding components | 1 hr. | 2 hrs. |
| Present Invention at 40° C. | 33 | 80 |

If desired, the present invention can be practiced without applying additional heat at all. Of course, the time required to achieve protection is longer.

| | Opacimeter Reading of CF-Draw-Down | | | |
|---|---|---|---|---|
| | ½ hr. | 1 hr. | 1½ hr. | 18 gr. |
| Present Invention at 24° C. | 49 | 47 | 35 | 67 |

When the above two lower (than 55° C.) temperature batches are tested along with representative examples of the present invention and urea-formaldehyde capsules in situations where the results obtained are related to the quality of the capsule wall, the capsule batches prepared at lower temperature are at least as good as those prepared using prior procedures.

| | Change in Typewriter Intensity Units after Storage of the CB Samples for 3 weeks at the Indicated Conditions | |
|---|---|---|
| | 140° F. Oven | Humidity Cabinet at 90° F–90% RH |
| urea-formaldehyde capsules made at 55° C. | −3 | +1 |
| Present Invention at 55° C. | −4 | 0 |
| Present Invention at 40° C. | −1 | +3 |
| Present Invention at 24° C. | −4 | 0 |

As determined in oven decline CB tests at 95° C., the present invention produces good capsules at room temperature in a reasonable amount of reaction time while the urea-formaldehyde capsule system does not give equivalent good capsules under equivalent conditions.

| | Processing Temperature | CB Storage in 95° C. Oven | |
|---|---|---|---|
| | | ITI | 1–3 Days |
| Present invention | 24° C. | 59 | 66 |
| urea-formaldehyde capsules | 21° C. | 64 | 100 |

EXAMPLE 9

A solution of 100 grams of a 10% aqueous solution of poly(methyl vinyl ether-co-maleic anhydride) ("Gantrez AN-119", molecular weight approximately 250,000), 100 grams of water and 65 grams of a 60% solution of etherified (methylated) methylol melamine resin ("Resloom M-75") is adjusted to a pH of about 4.8 with 20% NaOH. Into the solution is emulsified 180 grams of standard IP. The emulsion is placed in a 55° C. water bath with agitation to provide satisfactory capsules after approximately 30 minutes.

EXAMPLE 10

A solution of 40 grams of a 25% solution of poly(acrylic acid) having a molecular weight of approximately less than 150,000 ("Acrysol A-3", Rohm and Haas) and 160 grams of water is adjusted to a pH of about 4.0 with 20% NaOH. Fifty grams of 80% etherified methylol melamine resin solution ("Resimene 714", Monsanto) is added thereto. Then, 180 grams of standard IP is emulsified into the solution. The emulsion is placed in a 40° C. water bath which is warmed to 55° C. in approximately 15 minutes. Satisfactory capsules are obtained after heating and agitating for 45 minutes.

EXAMPLE 11

A solution of 50 grams of a 10% solution of poly(propylene-co-maleic anhydride), as the modifier material, and 100 grams of water is adjusted to a pH of 4.0 with 20% NaOH. Emulsified into this solution is 100 cc. of standard IP as described in Example 1. Then, 25 grams of 80% methylated methylol melamine resin ("Resimene 714") is added thereto. The emulsion is placed in a 55° C. water bath with agitation.

Successful capsules are obtained after processing for 25 minutes as evidenced by an opacimeter reading of 70 obtained with a draw-down on a CF sheet.

EXAMPLE 12

A solution of 38 grams of a 13% solution of poly(butadiene-co-maleic anhydride) in water ("Maldene 285") and 77 grams of water is adjusted to a pH of 4.0 with NaOH. To this solution is added 25 grams of 80% methylated methylol melamine resin ("Resimene 714") and 100 cc. of standard IP is emulsified therein. The emulsion is placed in a 55° C. bath.

Successful capsules are obtained as evidenced by an opacimeter reading of 74 obtained by a draw-down on a CF sheet after processing for 40 minutes.

EXAMPLE 13

A 10% aqueous solution of poly(vinyl acetate-co-maleic anhydride) is prepared by dissolving the polymer in water by steam injection and partially neutralizing with about 0.5 cc. of 20% sodium hydroxide per gram of polymer to yield a solution having a pH of about 4.0. A solution of 50 grams of said PVAMA solution, 100 grams of water and 25 grams of methylated methylol melamine resin ("Resimene 714") is then prepared, and 100 cc. (90 grams) of standard IP is emulsified therein. The emulsion is placed in a 55° C. water bath.

After 2 hours, a sample coated on a CF test strip gave a reflectance reading of 74%.

EXAMPLE 14

A solution of 20 grams of methylol melamine resin ("Resimene 817", Monsanto), 9.5 grams of a 37% aqueous formaldehyde solution and 5.5 grams of water is mixed and stirred at room temperature for 45 minutes to 1 hour until the solution thins out and becomes homogeneous. The pH of the resulting solution is about 6.0.

Twenty grams of a 25% aqueous solution of poly(acrylic acid) ("Acrysol A-3") and 130 grams of water are combined, and the pH is adjusted to 4.5. The previously prepared methylol melamine resin solution is added thereto, and 100 cc. (90 grams) of standard IP is emulsified into the mixture. The emulsion is placed in a 55° C. water bath.

After 1 hour and 45 minutes, a smaple of the emulsion coated on a CF test strip had a reflectance of 53%. A comparison sample coated on a nonreactive paper had a reflectance of 59%.

EXAMPLE 15

A solution of 20 grams of methylol melamine resin ("Resimene 817") and 15 grams of a 37% aqueous formaldehyde solution is mixed and stirred at room temperature for 45 minutes to 1 hour until the solution thins out and becomes homogeneous. The pH of the resulting solution is about 6.0.

Twenty grams of a 25% aqueous solution of poly(acrylic acid) ("Acrysol A-3") and 130 grams of water are combined, and the pH is adjusted to 4.5. The previously prepared methylol melamine resin solution is added thereto, and 100 cc. (90 grams) of standard IP is emulsified into the mixture. The emulsion is placed in a 55° C. water bath.

After 1 hour and 15 minutes, a sample of the emulsion coated on a CF test strip had a reflectance of 51%. A comparison sample coated on nonreactive paper had a reflectance of 61%.

EXAMPLE 16

A solution of 40 grams of a 13% solution of poly(butadiene-co-maleic anyhydride) ("Maldene 285") in water and 65 grams of water is adjusted to a pH of 4.5 with 20% NaOH. Added thereto is a solution of 17.5 grams of methylol melamine resin ("Resimene 814") dissolved in 17.5 grams of water. Then, 100 cc. (90 grams) of standard IP as described in Example 1 is emulsified into the mixture. The emulsion is placed in a 55° C. water bath.

After 1 hour and 25 minutes, a sample of this emulsion coated on a CF test strip gave a reflectance reading of 62%.

EXAMPLE 17

In the same manner as described in Example 8, a solution of 35 grams of a 10% aqueous solution of poly(ethylene-co-maleic anhydride) ("EMA-31"), 65 grams of a 10% aqueous solution of poly(ethylene-co-maleic anhydride) ("EMA-1103") and 157 grams of water is adjusted to a pH of 4.0 with 20% NaOH. Into this solution is emulsified 270 grams of standard IP, and 50 grams of methylated methylol melamine resin ("Resimene 714") is added thereto, making a total solids concentration of approximately 55% in the system.

The resulting emulsion is placed in a 55° C. water bath and is agitated therein for 2 hours, at which point the heating to the bath is turned off. Stirring of the system in the bath is continued overnight.

After adjustment of the pH to 7–8 with $NH_4OH$, the resulting capsules can be formulated for coating in a manner well known in the art and coated on a substrate material to provide carbonless CB sheets.

EXAMPLE 18

This example illustrates that encapsulation can be successfully obtained even without agitation after the ingredients have been combined.

A solution of 35 grams of a 10% solution of poly(ethylene-comaleic anhydride) (Monsanto "EMA-31"), 65 grams of a 10% solution of poly(ethylene-co-maleic anhydride) (Monsanto "EMA-1103") and 170 grams of water is adjusted to a pH of 4 with 20% NaOH. Into this solution is emulsified 270 grams of standard IP, and 50 grams of methylated methylol melamine resin ("Resimene 714") is added thereto.

The resulting emulsion is placed in a 70° C. water bath with no agitation. Successful capsules satisfactory for use in carbonless copying paper are obtained without any agitation of the system as the batch does not set up. Draw-downs on CF test sheets show the formation of capsules, the opacimeter reading reaching at least 70 after one hour.

COMPARATIVE EXAMPLE

This example demonstrates that successful capsules cannot be obtained merely by substituting the starting reactants of the present invention in the procedures taught in the prior art, e.g., manufacturing instruction A in U.S. Pat. No. 3,594,328.

Into a solution of 125 grams of methylated methylol melamine resin (Monsanto "Resloom M-75") and 75 grams of water was emulsified 225 ml. of standard IP as described in Example 1. The pH of the emulsion was lowered to 4.0 with glacial acetic acid. The emulsion was placed with stirring in a 55° C. water bath. After 1 hour and 10 minutes, the batch set up as a single solid mass.

The amounts and kinds of encapsulating system materials used in these examples are any of those previously disclosed. The starting materials can be monomeric compounds such as melamine and formaldehyde, methylol melamines or methylated methylol melamines. Commercially available methylol melamines and methylated methylol melamines generally are mixtures of monomers and oligomers, i.e., low molecular weight polymers, and can contain small quantities of free formaldehyde and unreacted melamine. Commercial methylated methylol melamines can also contain some nonetherified methylol melamine. Accordingly, some of these commercially available products can contain all of the starting materials. The concentration of these materials in the aqueous phase can be about 5% to about 20%.

The pH of the encapsulating system during polycondensation can be about 4.3 to about 6.0. Eligible temperatures of operation range from about 20° to 100° under ambient conditions, about 50°–60° being preferred.

By adjusting the degree of agitation, if employed, droplets of liquid intended capsule core material can be produced of any size from a few to several hundred microns. Moreover, the amount of intended capsule core material can be altered to change the amount of completed capsule which is internal phase as opposed to capsule wall material. Capsules can generally be made from less than 50 percent internal phase to 95 percent internal phase, or more.

The amount of system modifier in the encapsulating system appears to be important to the practice of this invention, with respect to the minimum amount to assure adequate interference with the condensation reaction to form polymer and with respect to the maximum amount as an economic matter. Of course, if the system modifier is present in very high concentrations, the system viscosity will be inoperably high. As a general rule, the encapsulating system should include at least about 0.4 percent system modifier. At the other extreme, it must be remembered that the variety of eligible materials precludes establishment of an exact general maximum due to differences in solution viscosity among the several materials. It can be said that more than 10 percent is seldom used or required. However, amount of system modifier of up to about 15 percent can be employed, if desired. Different molecular weight grades of the same system modifier can be combined advantageously in some cases and different system modifiers also can be combined.

It may be generally stated that the amount of system modifier material employed is that amount sufficient to modify the polymerization of the melamine with formaldehyde, in one embodiment, or the polymerization of the methylol melamine or low molecular weight polymers thereof or methylated methylol melamine or low molecular weight polymers thereof, in another embodiment of the invention, so as to permit formation of polymeric capsular walls therefrom.

In the encapsulating systems of this invention, the amount of materials present in the aqueous manufacturing vehicle may be varied over a wide range. Such systems in which the aqueous portion constitutes less than 60%, and even 45% or less, by volume of the total system can be readily employed. Furthermore, depending upon the choice of system modifier(s), viscosities of less than 300 cps have been achieved in systems containing these lesser volume percents of the aqueous portion.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for manufacturing minute capsules, en masse, in an aqueous manufacturing vehicle, comprising:
   establishing an agitating aqueous system comprising
   (A) melamine and formaldehyde,
   (B) monomeric methylol melamine or a low molecular weight polymer thereof or
   (C) monomeric methylated methylol melamine or a low molecular weight polymer thereof as a starting material or mixtures of any of said starting materials, about 0.4 to about 15 percent by weight, based on the weight of aqueous manufacturing vehicle, of a system modifier material selected from the group consisting of poly(ethylene-co-maleic anhydride), poly(methyl vinyl ether-co-maleic anhydride), poly(acrylic acid), poly(propylene-co-maleic anhydride), poly(butadiene co-maleic anhydride) and poly(vinyl acetate-co-maleic anhydride), and particles of an intended capsule core material substantially insoluble in the system, in which agitating system the modifier is present prior to the addition of said particles, whereby said starting material polycondenses to form a condensation polymer resulting in
   (i) liquid-liquid phase separation of the resulting condensation polymer above a molecular weight to be soluble in the system and
   (ii) continued polycondensation of the separated polymerization product to give solid capsule wall material individually surrounding particles of the dispersed intended capsule core.

2. The process of claim 1, wherein the polycondensation reaction is effected while continuing to agitate the aqueous system.

3. The process of claim 1, wherein the poly(ethylene-co-maleic anhydride) has a molecular weight of greater than about 1000, the poly(vinyl methyl ether-co-maleic anhydride) has a molecular weight of greater than about 250,000 and the poly(acrylic acid) has a molecular weight of greater than about 5,000.

4. The process of claim 1, wherein the aqueous manufacturing vehicle is less than 60 percent, by volume, of the system.

5. The process of claim 1, wherein the aqueous manufacturing vehicle is 45% or less, by volume, of the system.

6. The process of claim 1, wherein the pH of the aqueous manufacturing vehicle is maintained between about 4.3 to 6.0 during the polycondensation reaction.

7. The process of claim 1, wherein the amount of modifier material in the system is about 0.4 to about 10 percent, by weight, of the aqueous manufacturing vehicle.

8. The process of claim 1, wherein the polycondensation reaction is effected at a temperature of about 20° C. to about 100° C.

9. A process for manufacturing minute capsules, en masse, in an aqueous manufacturing vehicle, comprising the steps of:
   (a) establishing an agitating single-phase aqueous solution system comprising about 0.4 to about 15 percent by weight, based on the weight of aqueous manufacturing vehicle, of a system modifier material selected from the group consisting of poly(ethylene-co-maleic anhydride), poly(methyl vinyl ether-co-maleic anhydride), poly(acrylic acid), poly(propylene-co-maleic anhydride), poly(butadiene-co-maleic anhydride), and poly(vinyl acetate-co-maleic anhydride),
   (b) dispersing into the solution system particles of an intended capsule core material substantially insoluble in the system,
   (c) adding a starting material which comprises (A) melamine and formaldehyde, (B) monomeric methylol melamine or a low molecular weight polymer thereof or (C) monomeric methylated methylol melamine or a low molecular weight polymer thereof, or mixtures of any of said (A), (B) and (C) to the system, and
   (d) polycondensing said starting material to form a condensation polymer resulting in
      (i) liquid-liquid phase separation of the resulting condensation polymer above a molecular weight to be soluble in the system and
      (ii) continued polycondensation of the separated polymerization product to give solid capsule wall material individually surrounding particles of the dispersed intended capsule core.

10. The process of claim 9, wherein the polycondensation reaction is effected while continuing to agitate the aqueous system.

11. The process of claim 9, wherein the amount of modifier material in the system is about 0.4 to about 10 percent, by weight, of the aqueous manufacturing vehicle.

12. The process of claim 9, wherein the polycondensation reaction is effected while heating the system at a temperature of about 25° C. to about 100° C.

13. The process of claim 12, wherein said heating is commenced prior to step (c).

14. A process for manufacturing minute capsules, en masse, in an aqueous manufacturing vehicle, comprising the steps of:
   (a) establishing an agitating single-phase aqueous solution system comprising about 0.4 to about 15 percent by weight, based on the weight of aqueous manufacturing vehicle, of a system modifier material selected from the group consisting of poly(ethylene-co-maleic anhydride), poly(methyl vinyl ether-co-maleic anhydride), poly(acrylic acid), poly(propylene-co-maleic anhydride), poly(butadiene-co-maleic anhydride) and poly(vinyl acetate-co-maleic anhydride),
   (b) adding a starting material which comprises (A) melamine and formaldehyde, (B) monomeric methylol melamine or a low molecular weight polymer thereof or (C) monomeric methylated methylol melamine or a low molecular weight polymer thereof, or mixtures of any of said (A), (B) and (C) to the system,
   (c) dispersing into the solution system particles of an intended capsule core material substantially insoluble in the system, and (d) polycondensing said starting material to form a condensation polymer resulting in
  (i) liquid-liquid phase separation of the resulting condensation polymer above a molecular weight to be soluble in the system, and
  (ii) continued polycondensation of the separated polymerization product to give solid capsule wall material individually surrounding particles of the dispersed intended capsule core.

15. The process of claim 14, wherein the polycondensation reaction is effected while continuing to agitate the aqueous system.

16. The process of claim 14, wherein the amount of modifier material in the system is about 0.4 to about 10 percent, by weight, of the aqueous manufacturing vehicle.

17. The process of claim 14, wherein the polycondensation reaction is effected while heating the system at a temperature of about 25° C. to about 100° C.

* * * * *